(12) United States Patent
Hilerio et al.

(10) Patent No.: US 9,449,113 B2
(45) Date of Patent: Sep. 20, 2016

(54) BROWSER STORAGE MANAGEMENT

(75) Inventors: Israel Hilerio, Kenmore, WA (US); David J. Sheldon, Seattle, WA (US); David Vaughn Winkler, Seattle, WA (US); Matthew R. Cox, Kirkland, WA (US); Jonathan A. Silvera, Seattle, WA (US); Ivan D. Pashov, Woodinville, WA (US); Martin A. Chisholm, Bellevue, WA (US); Dany Joly, Vancouver (CA); Victor Ngo, Kirkland, WA (US); Adam U. Herchenroether, Seattle, WA (US); Katerina V. Sedova, Seattle, WA (US); Kedar Sanjeev Hirve, Kent, WA (US); Karen Elizabeth Parker Anderson, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 275 days.

(21) Appl. No.: 13/171,226

(22) Filed: Jun. 28, 2011

(65) Prior Publication Data

US 2013/0007371 A1    Jan. 3, 2013

(51) Int. Cl.
*G06F 12/00*    (2006.01)
*G06F 17/30*    (2006.01)
*G06F 12/08*    (2016.01)

(52) U.S. Cl.
CPC ..... *G06F 17/30902* (2013.01); *G06F 12/0866* (2013.01); *G06F 2212/465* (2013.01)

(58) Field of Classification Search
CPC .............. G06F 12/0866; G06F 2212/465
USPC ........................................ 707/813
See application file for complete search history.

(56) References Cited

U.S. PATENT DOCUMENTS

| 6,023,726 | A  | * | 2/2000  | Saksena ............... 709/219 |
| 6,032,227 | A  | * | 2/2000  | Shaheen et al. ...... 711/129 |
| 6,370,614 | B1 | * | 4/2002  | Teoman et al. ...... 711/113 |
| 6,594,682 | B2 |   | 7/2003  | Peterson et al. |
| 7,076,500 | B2 |   | 7/2006  | Gallant et al. |
| 7,188,240 | B1 |   | 3/2007  | Berstis et al. |
| 7,454,564 | B2 |   | 11/2008 | Roskind |
| 7,499,996 | B1 |   | 3/2009  | Buchheit et al. |
| 7,778,987 | B2 |   | 8/2010  | Hawkins |
| 2004/0044767 | A1 | * | 3/2004 | Rivers et al. .......... 709/225 |
| 2004/0221289 | A1 | * | 11/2004 | D'Souza et al. ...... 718/102 |
| 2009/0172694 | A1 |   | 7/2009 | Nochimowski et al. |

OTHER PUBLICATIONS

Shahabi, Cyrus et al., "Knowledge Discovery from Users Web-Page Navigation", In Proceedings of RIDE 1997, Available at <http://ieeexplore.ieee.org/stamp/stamp.jsp?tp=&arnumber=583692>,(Apr. 1997), pp. 20-29.

Xiao, Li et al., "Exploiting Neglected Data Locality in Browsers", In Proceedings of WWW 2001, Available at <http://www10.org/cdrom/posters/1075.pdf>,(May 2001),2 pages.

* cited by examiner

*Primary Examiner* — Mariela Reyes
*Assistant Examiner* — Mohsen Almani
(74) *Attorney, Agent, or Firm* — Bryan Webster; Raghu Chinagudabha; Micky Minhas

(57) ABSTRACT

Browser storage management techniques are described. In one or more implementations, inputs are received at a computing device that specify maximum aggregate sizes of application and database caches, respectively, of browser storage to be used to locally store data at the computing device. For example, the inputs may be provided using a policy, by an administrator of the computing device, and so on. The maximum aggregate sizes are set of application and database caches, respectively, of browser storage at the computing device to the sizes specified by the inputs.

19 Claims, 9 Drawing Sheets

BROWSER STORAGE MANAGEMENT

BACKGROUND

The amount of data that is available to users via a network (e.g., the Internet) is ever increasing. For example, users may access websites to receive webpages, interact with social networks, photo sharing sites, send and receive messages, and so on. Consequently, even a casual user may interact with a significant amount of data.

Techniques were subsequently developed to aid users in this interaction by storing content locally on a computing device. In this way, users could quickly access the data and may even do so when "offline." However, conventional techniques there were employed to manage this storage were often intrusive and therefore could hinder a user's interaction with the data or were not employed at all thereby exposing the computing device to malicious parties.

SUMMARY

Browser storage management techniques are described. In one or more implementations, inputs are received at a computing device that specify maximum aggregate sizes of application and database caches, respectively, of browser storage to be used to locally store data at the computing device. For example, the inputs may be provided using a policy, by an administrator of the computing device, and so on. The maximum aggregate sizes are set of the application and database caches, respectively, of browser storage at the computing device to the sizes specified by the inputs.

In one or more implementations, a computing device detects that the maximum individual storage size of browser storage specified for a domain has been reached. In response to the detection, a prompt is output in the user interface by the computing device that includes an option to expand the maximum individual storage size of browser storage for the domain.

In one or more implementations, a determination is made of a maximum aggregate size that has been set for an application cache and a maximum aggregate size that has been set for a database cache of browser storage usable to locally store data at the computing device. The maximum aggregate sizes of the application and data caches being user configurable, respectively. The computing device detects that the maximum aggregate size of the application cache or the maximum aggregate size of the database cache has been exceeded. Responsive to the detection, a prompt is output in a user interface by the computing device that indicates that an amount of data to be stored in the application or database cache has reached the maximum aggregate size, respectively.

In one or more implementations, it is detected that an amount of data that has been stored in at least one of an application or database cache that is local to a computing device has reached a threshold. A garbage collection technique is initiated automatically and without user intervention by the computing device to determine if at least a portion of the data that has been stored in the at least one of the application or database caches is permitted to be removed according to one or more criteria and if so, at least the portion of the data is removed.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items.

DETAILED DESCRIPTION

Overview

Browser storage is typically employed to store data associated with network access locally at the computing device, such as through database and application caches. However, traditional browser storage techniques do not provide a mechanism for end-users and IT professionals to control the amount of data that can be stored on the computing device. In addition, some conventional techniques involve a liberal use of user prompts that necessitate user intervention before data can be stored on the computing machine, which could lead to user frustration and confusion as a casual user may not understand the intricacies involved in this management. Furthermore, some conventional techniques were inflexible and therefore made it difficult for corporations that use complex internet or intranet applications from being able to configure their web application storage limits to avoid these prompts, securely, and in some cases work properly.

Techniques are described herein for browser storage management. In one or more implementations, these techniques allow users and administrators to define limits that may be employed to govern when a user is prompted to allow a website to store additional data in storage on a computing device. In addition, configurable defaults may be provided to govern an aggregate size of each of the local caches both individually and together. Further, individual configurable settings may be provided for local database and application caches, which may be configured using group policies, via administrator privileges, and so on. Thus, a balance may be achieved to allow a user to interact with a computing device without needlessly prompting the user. Further discussion of these and other techniques may be found in relation to the following figures.

In the following discussion, an example environment is first described that may employ the techniques described herein. Example procedures are then described which may be performed in the example environment as well as other environments. Consequently, performance of the example procedures is not the network limited to the example environment and the example environment is not limited to performance of the example procedures.

Example Environment

Figure 1:
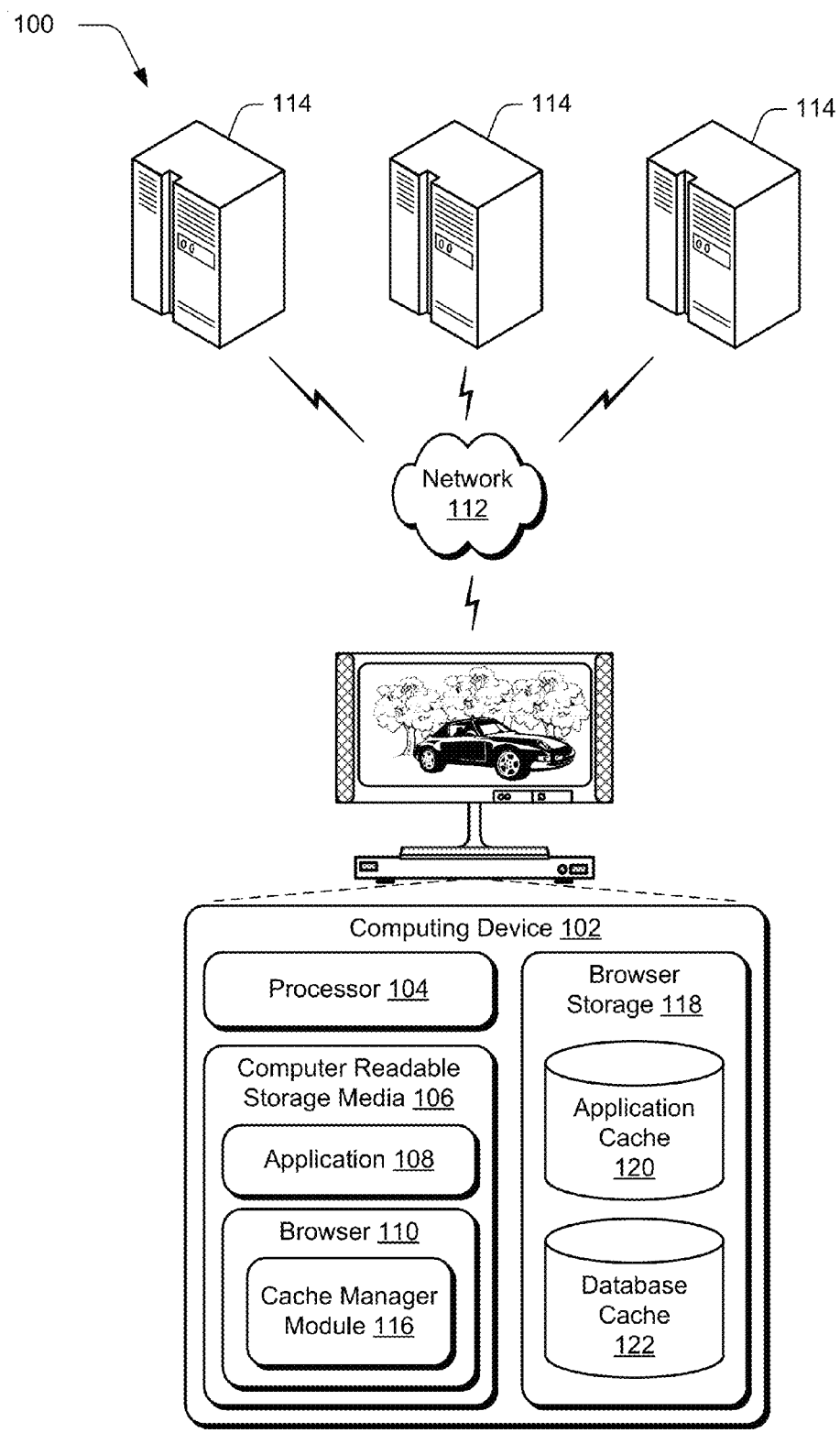
FIG. 1 is an illustration of an environment in an example implementation that is operable to perform one or more browser storage management techniques.

FIG. 1 illustrates an operating environment in accordance with one or more embodiments, generally at 100. Environment 100 includes a computing device 102 having one or more processors 104, one or more computer-readable storage media 106 and one or more applications 108 that reside on the computer-readable storage media and which are executable by the processor 104. Computing device 102 can be embodied as any suitable computing device such as, by way of example and not limitation, a desktop computer, a portable computer, a handheld computer such as a personal digital assistant (PDA), mobile phone, tablet computer, and the like. One of a variety of different examples of a computing device 102 is shown and described below in FIGS. 9 and 10.

The computing device 102 of FIG. 1 is also illustrated as including a browser 110, e.g., a web browser, which may be implemented using one or more modules as further described below. The browser 110 is representative of functionality that is configured to navigate via the network 112. Although the network 112 is illustrated as the Internet, the network may assume a wide variety of configurations. For example, the network 112 may include a wide area network (WAN), a local area network (LAN), a wireless network, a public telephone network, an intranet, and so on. Further, although a single network 112 is shown, the network 112 may be configured to include multiple networks.

The browser 110, for instance, may be configured to navigate via the network 112 to interact with content available from one or more web servers 114 as well as communicate data to the one or more web servers 114, e.g., perform downloads and uploads. The web servers 114 may be configured to provide one or more services that are accessible via the network 112. Examples of such services include email, web pages, photo sharing sites, social networks, content sharing services, media streaming services, and so on.

One or more of the applications 108 may also be configured to access the network 112, e.g., directly themselves and/or through the browser 110. For example, one or more of the applications 108 may be configured to communicate messages, such as email, instant messages, and so on. In additional examples, an application 108, for instance, may be configured to access a social network, obtain weather updates, interact with a bookstore service implemented by one or more of the web servers 114, support word processing, provide spreadsheet functionality, support creation and output of presentations, and so on.

Thus, applications 108 may also be configured for a variety of functionality that may involve direct or indirect network 112 access. For instance, the applications 108 may include configuration settings and other data that may be leveraged locally by the application 108 as well as synchronized with applications that are executed on another computing device. In this way, these settings may be shared by the devices. A variety of other instances are also contemplated. Thus, the computing device 102 may interact with content in a variety of ways from a variety of different sources.

The browser 110 in the illustrated example is also shown as including a cache manager module 116. The cache manager module 116 is representative of functionality of the computing device 102 to manage browser storage 118 that is local to the computing device 102. The browser storage 118 may thus be used to maintain data locally at the computing device 102 that may involve network access. Although illustrated separately, the browser storage 118 may be implemented at least in part using computer readable storage media 106.

As illustrated in FIG. 1, the browser storage 118 includes an application cache 120 and a database cache 122. The application cache 120 is representative of one or more caches that may be used to store data obtained from websites, such as images, hypertext markup language (HTML) data, and so on that are involved in the generation and display of webpages. In one or more implementations, the application cache 120 may be accessed even when a source of corresponding data is unavailable, e.g., a web server 114 that provided the data is offline, lack of a network connection, and so on. In this way, the browser 110 may navigate through copies of webpages that are stored locally at the computing device 102 as if the webpages were obtained via the network connection, thereby providing a seamless user experience.

The database cache 122 is representative of storage for database, such as data that may be used to synchronize with one or more websites, such as to expose local storage through database like application programming interfaces (APIs), which may or may not be a cache of data for storage elsewhere on the computing device 102. For example, data in the database cache 122 may include contacts, configuration settings, and so on that may be utilized locally at the computing device 102 through normal usage, such as by a scheduling and email application. This data may also be leveraged as part of a website to share the data with other computing devices, such as to disseminate the configuration settings to other computing devices of the user. A variety of different techniques may be employed by the cache manager module 116 to manage browser storage 118, an example of which may be found beginning in relation to FIG. 2.

While various examples of cache management are described herein in the context of a browsing environment and a browser, it is to be appreciated that the cache manager module 116 and corresponding techniques can be employed in a variety of environments and with any suitable applications that make use of browser-side storage. By way of example, the cache manager module 116 can be implemented to manage browser storage 118 for one or more of the browser 110 as well as applications 108 and other functionality of the computing device 102.

Generally, any of the functions described herein can be implemented using software, firmware, hardware (e.g., fixed logic circuitry), or a combination of these implementations. The terms "module," "functionality," and "logic" as used herein generally represent software, firmware, hardware, or a combination thereof. In the case of a software implementation, the module, functionality, or logic represents program code that performs specified tasks when executed on a processor (e.g., CPU or CPUs). The program code can be stored in one or more computer readable memory devices. The features of the techniques described below are platform-independent, meaning that the techniques may be implemented on a variety of commercial computing platforms having a variety of processors.

For example, the computing device 102 may also include an entity (e.g., software) that causes hardware of the computing device 102 to perform operations, e.g., processors, functional blocks, and so on. For example, the computing device 102 may include a computer-readable medium that may be configured to maintain instructions that cause the computing device, and more particularly hardware of the computing device 102 to perform operations. Thus, the instructions function to configure the hardware to perform the operations and in this way result in transformation of the hardware to perform functions. The instructions may be provided by the computer-readable medium to the computing device 102 through a variety of different configurations.

One such configuration of a computer-readable medium is signal bearing medium and thus is configured to transmit the instructions (e.g., as a carrier wave) to the hardware of the computing device, such as via a network. The computer-readable medium may also be configured as a computer-readable storage medium and thus is not a signal bearing medium. Examples of a computer-readable storage medium include a random-access memory (RAM), read-only memory (ROM), an optical disc, flash memory, hard disk memory, and other memory devices that may use magnetic, optical, and other techniques to store instructions and other data.

Having described an example environment in which the techniques described herein may operate, consider now a discussion of some example embodiments that can utilize the cache manager module 116.

Figure 2:
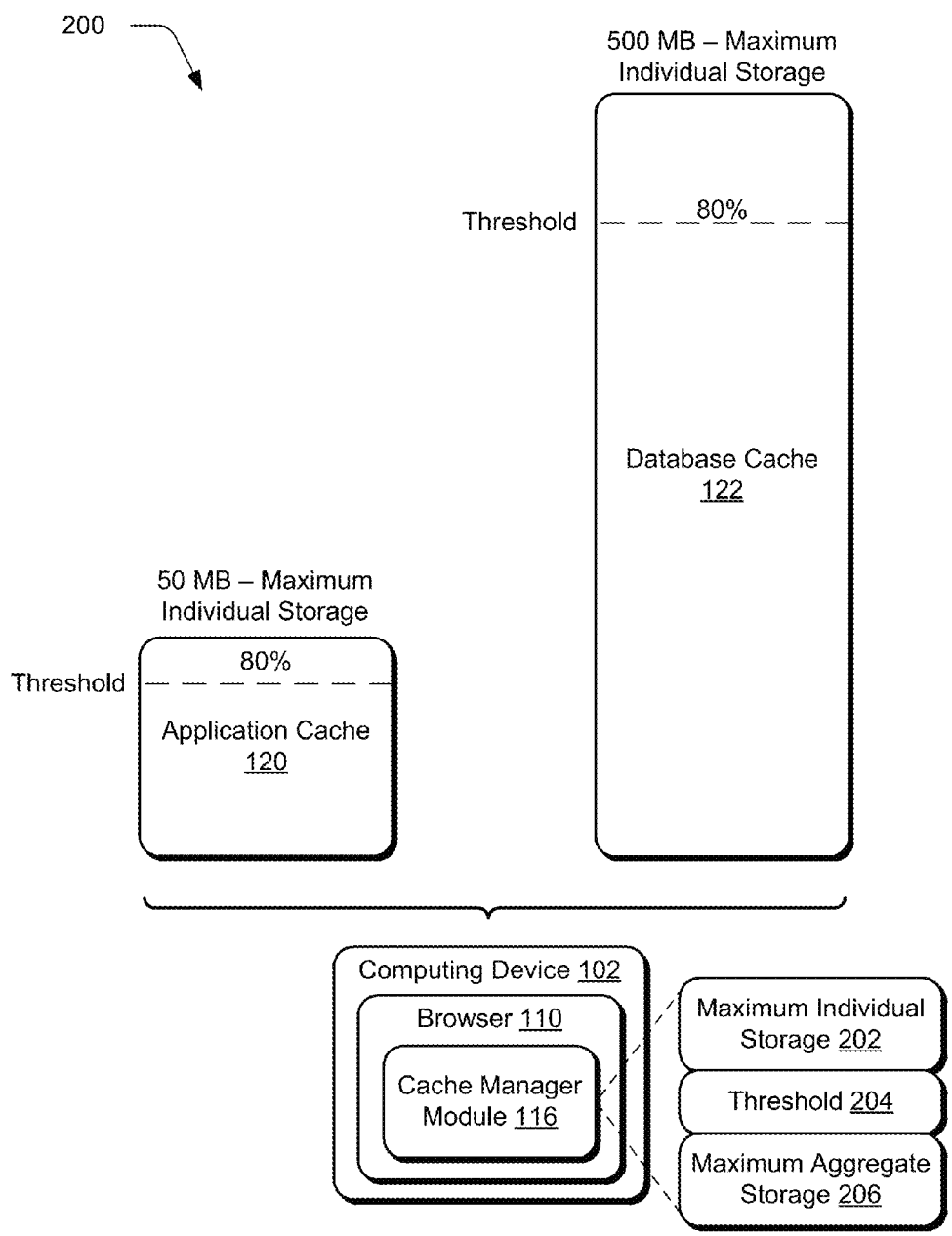
FIG. 2 depicts an example implementation of configurable inputs of a cache manager module that may be used to manage browser storage.

FIG. 2 depicts an example implementation of configurable inputs of the cache manager module 116 that may be used to manage browser storage 118 of FIG. 2. In one or more implementations, the cache manager module 116 may be configurable to provide administrators of the computing device 102 (e.g., an end user accessing the computing device 102 using administrator privileges), information technology personnel, and so forth an ability to control how the cache manager module 116 manages the browser storage 118.

For example, a group policy may be written and disseminated to a plurality of the computing devices 102 in an enterprise. The policy may provide a variety of inputs to specify how the cache manager module 116 is to perform as further described below. Likewise, a user may login to the computing device 102 as an administrator to order to access configuration settings of the cache manager module 116, e.g., using administrator privileges of the computing device 102. A variety of other examples are also contemplated.

Regardless of the technique used, the inputs may specify a variety of different configuration settings. For example, the inputs may specify a maximum individual storage 202 amount that is usable by websites in the application cache 120 and/or database cache 122. As shown in FIG. 2, for instance, a website may be set to consume a maximum of fifty megabytes in an application cache 120 and five hundred megabytes of a database cache 122 without causing output of a user prompt. In this way, a website may be given a base amount of use without interfering with a user's interaction with the website, e.g., by outputting a prompt to determine if the website is trusted, to notify that a cache is consumed, and so on. Upon reaching the specified amount, a prompt may be output as further described below.

A threshold 204 may also be employed by the cache manager module 116 to determine when to employ one or more garbage collection techniques. For example, the threshold 204 may be set in a variety of ways, such as based on a maximum individual storage for a particular website, e.g., 80% of the maximum individual storage 202 is consumed, when a particular amount such as ten megabytes remains, in relation to a maximum aggregate storage 206, and so on.

When this threshold 204 is reached, the cache manager module 116 may automatically and without user intervention employ criteria to determine which data, if any, may be removed from the respective cache. For example, the cache manager module 116 may automatically delete data that has not been accessed by a user within a predefined amount of time, such as thirty days. A variety of other criteria are also contemplated, such as based on content type (e.g., delete images due to size), purpose (e.g., delete ads but have other content remain since ads may be frequently updated), and so forth. In this way, the cache manager module 116 may operate "behind the scenes" before the maximum individual storage 202 amount is reached to determine if operations may be performed to alleviate this condition before interfering with the user's interaction with the computing device 102.

A maximum aggregate storage 206 may also be specified for use in managing the browser storage 118 by the cache manager module 116. The maximum aggregate storage 206 amount, for instance, may specify a total amount of storage space that is permitted to be used at the client device 102 for the application cache 120 and the database cache 122. For instance, the maximum aggregate storage 206 amount for the application cache 120 may be specified as one gigabyte and the maximum aggregate storage 206 amount for the database cache 122 may be specified as four gigabytes. Naturally, a variety of other amounts may also be specified. In this way, the cache manager module 116 may protect the computing device 102 from malicious parties, such as from a malicious party that may try to perform a denial of service attack, may cause data to be stored from a plurality of different websites, and so forth. As above, the cache manager module 116 may also employ a threshold to initiate one or more garbage collection techniques before reaching the maximum aggregate storage 206 amount. Upon reaching the maximum individual storage 202 and/or maximum aggregate storage 206 amounts, the cache manager module 116 may output a variety of prompts to provide a variety of functionality, examples of which are described beginning in relation to the following figure.

Figure 3:
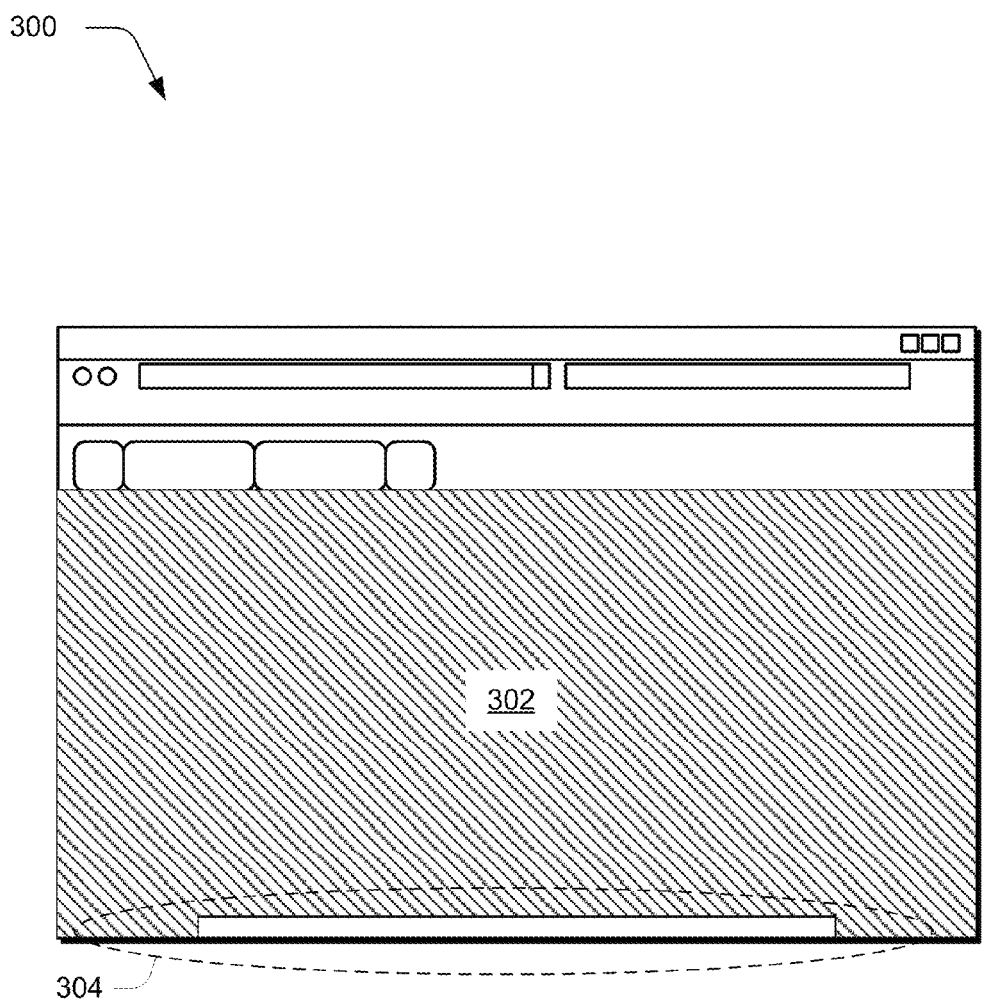
FIG. 3 illustrates an example implementation of a user interface of a browser of FIGS. 1 and 2 in accordance with one or more embodiments of browser storage management techniques.

FIG. 3 illustrates an example implementation of a user interface 300 of the browser 110 of FIGS. 1 and 2 in accordance with one or more embodiments of browser storage management techniques. The depicted user interface 300 is but one example of an application that can make use of the cache manager module 116 to manage browser storage 118.

The user interface 300 may include typical instrumentalities that are employed by browsers such as back and forward navigation buttons, an address bar, a search bar, and a tab band that can support multiple tabs, each of which are undesignated for the sake of brevity in the figure. The user interface 300 also includes a content rendering area 302 (designated by the cross hatching) in which content can be rendered.

In addition, user interface 300 includes a notification bar 304. In one or more embodiments, the notification bar 304 is designed to help users maintain focus on their browsing activities, while offering notifications in the form of prompts. Notifications presented via the notification bar can include prompts related to management of browser storage that are output or otherwise caused via operation of the cache manager module 116 to enable various techniques for cache management.

In at least some embodiments, the notification bar is presented at a location within the browsing field-of-view that is selected to reduce user distraction. For example, in the illustrated and described embodiment, the notification bar 304 is presented at or near the bottom of the user interface 300, here adjacent the bottom of or below content rendering area 302. The notification bar 304 is designed to be noticeable yet ignorable, thus enabling a user to continue with their browsing tasks in content rendering area 302, without being distracted by a modal dialog. Further, in at least some embodiments, the notification bar is presented in a manner which overlays content that is rendered by the web browser. The notification bar's location effectively prioritizes content that is rendered within content rendering area 302 over a particular notification that might appear in the notification bar 304.

Having considered an example user interface 300 that makes use of a notification bar in accordance with one or more embodiments, consider now some details regarding example browser storage management techniques that can be provided in accordance with one or more embodiments.

Figure 4:
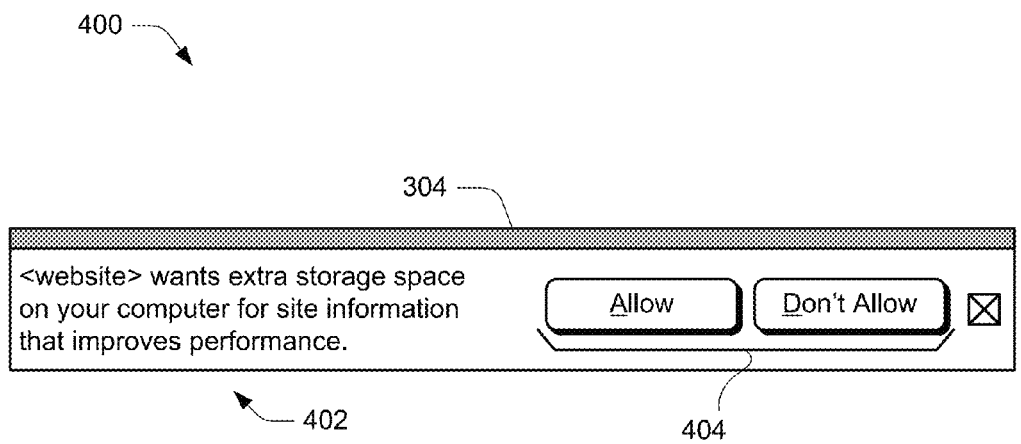
FIG. 4 depicts an example implementation of a notification bar of FIG. 3 as outputting a prompt to indicate to a user that a maximum individual storage amount for a website has been reached.

FIG. 4 depicts an example implementation 400 of the notification bar 304 of FIG. 3 as outputting a prompt to indicate to a user that a maximum individual storage amount for a website has been reached. In this example, text 402 is included in the notification bar 304 that describes that "<website> wants extra storage space on your computer for site information that improves performance." A variety of other prompts are also contemplated, such as "Do you trust <website> to store data on your computer?" The prompt also includes commands 404 that are selectable to allow or not allow the prompted action to occur.

This notification may be output responsive to meeting a maximum individual threshold for a website in either the application cache 120 and/or database cache 122. Thus, a user is interrupted when the limit is reached in this example but is not interrupted beforehand.

Figure 5:
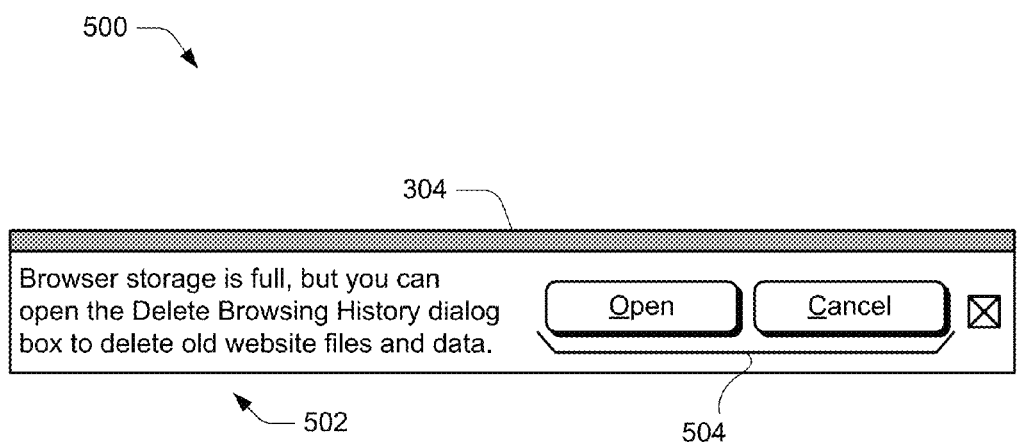
FIG. 5 depicts an example implementation of the notification bar of FIG. 3 as outputting a prompt to indicate to a user that a maximum aggregate storage amount has been reached for an application cache and/or database cache.

FIG. 5 depicts an example implementation 500 of the notification bar 304 of FIG. 3 as outputting a prompt to indicate to a user that a maximum aggregate storage amount has been reached for an application cache and/or database cache. In this example, text 502 is included in the notification bar 304 that describes that "Browser storage is full, but you can open the Delete Browsing History dialog box to delete old website files and data." The prompt also includes commands 504 that are selectable to open the dialog or cancel the action.

Thus, this notification may be output responsive to meeting a maximum aggregate storage 206 for each of the websites in total in either the application cache 120 and/or the database cache 122. Thus, in this instance also a user is interrupted when the limited is reached but is not interrupted beforehand. Selection of the command 504 for "open" may cause output of an option in which a user may manually specify which data is to be deleted from browser storage 118 to "make room," an example of which may be found in relation to the following figure.

Figure 6:
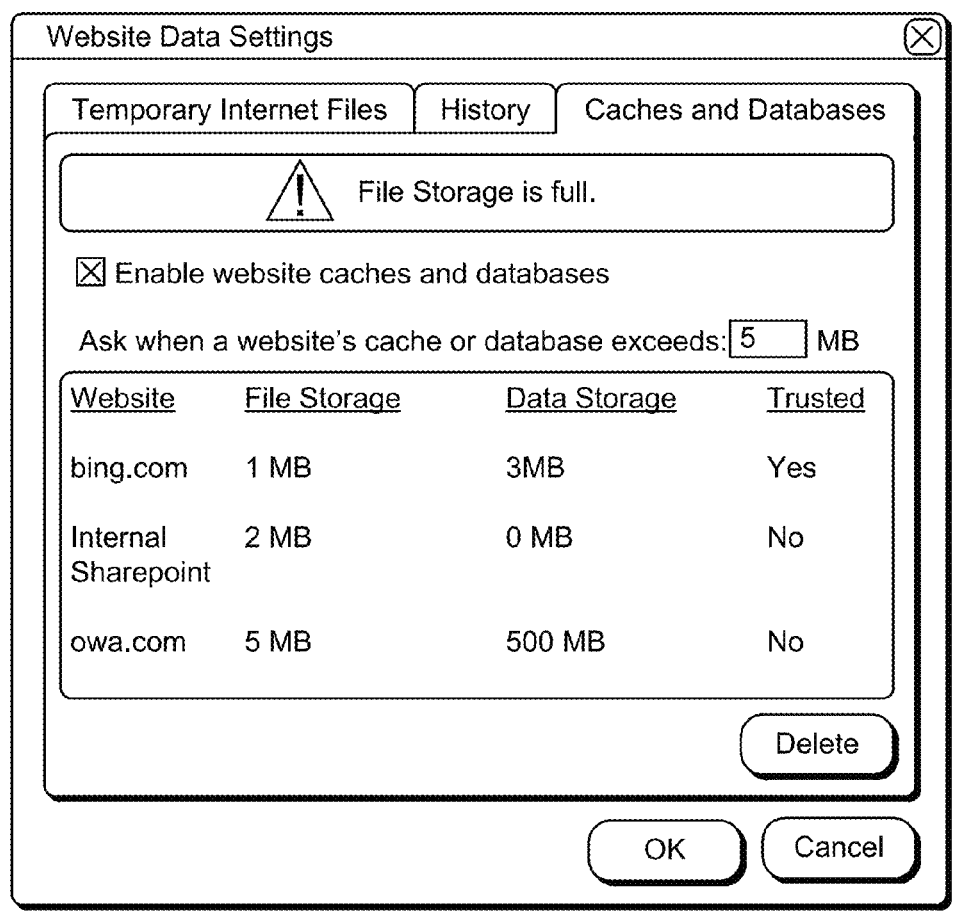
FIG. 6 depicts an example implementation of a user interface that is configured to provide options for a user to manually specify data to be deleted by which network domain is involved with the data.

FIG. 6 depicts an example implementation of a user interface 600 that is configured to provide options for a user to manually specify data to be deleted by which network domain is associated with the data. The user interface 600 in the illustrated example is configured as a tabbed window that includes selectable tabs for "Temporary Internet Files," "History," and "Caches and Databases." The "Caches and Databases" tab is selected in this instance and outputs data that relates to the cache manager module 116 and browser storage 118.

The user interface 600, for instance, includes an option to "enable website caches and databases" using a checkbox. The user interface 600 also includes an option to specify when a prompt is to be output for an individual domain, i.e., to set the maximum individual storage 202 amount for a website. This is illustrated in FIG. 6 as "Ask when a website's cache or database exceeds: 5 MB" with the amount "5" being configurable by a user.

The user interface 600 also includes storage values that are separated by domain to inform users of the computing device 102 as to how much storage space each domain consumes. Each of the descriptions of the domains are selectable and stored data that is associated with the domains may be deleted by selecting the "delete" command. In one or more implementations, selection of the domain causes associated data in both the application and database caches 120, 122 to be deleted, thereby conserving space in both places. Thus, data from one cache may be deleted responsive to the "filling" of another cache. In other words, data from the database cache 122 and the application cache 120 may be deleted responsive to reaching the maximum value of either one of the caches.

The user interface 600 further includes a notification message that "File Storage is full" to indicate that the application cache 122 is full. Other notification messages may also be displayed, such as "Data Storage is Full" to indicate that the database cache 120 is full, "File and Data Storage are both Full," and so on. Further description of these and other techniques that relate to browser storage may be found in relation to the following procedures.

Example Procedures

The following discussion describes browser storage management techniques that may be implemented utilizing the previously described systems and devices. Aspects of each of the procedures may be implemented in hardware, firmware, or software, or a combination thereof. The procedures are shown as a set of blocks that specify operations performed by one or more devices and are not necessarily limited to the orders shown for performing the operations by the respective blocks. In portions of the following discussion, reference will be made to FIGS. 1-6.

Figure 7:
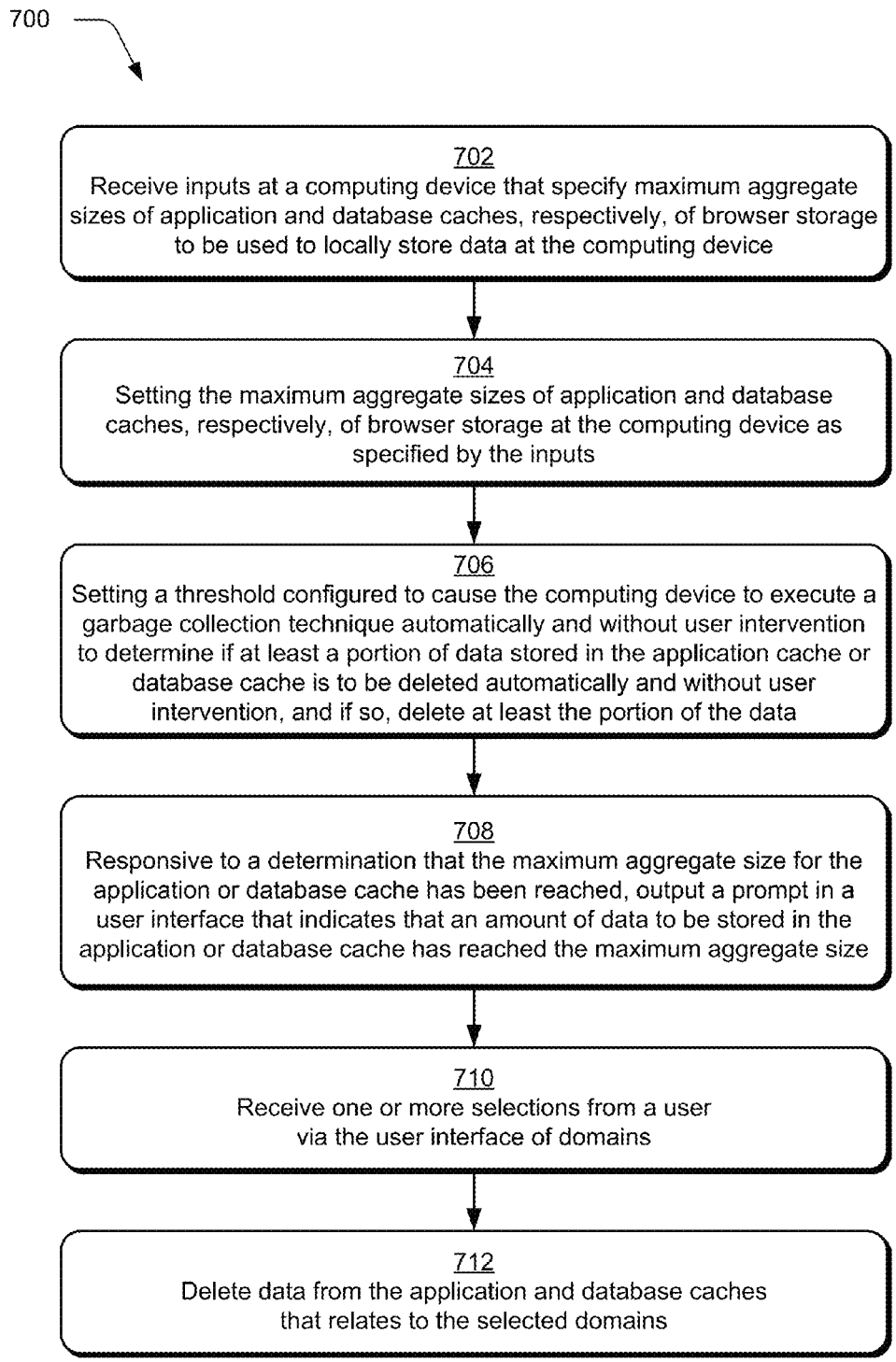
FIG. 7 is a flow diagram depicting a procedure in an example implementation in which maximum aggregate sizes of application and database caches, respectively, are set to manage browser storage.

FIG. 7 depicts a procedure 700 in an example implementation in which maximum aggregate sizes of application and database caches, respectively, are set to manage browser storage. Inputs are received at a computing device that specify maximum aggregate sizes of application and database caches, respectively, of browser storage to be used to locally store data at a computing device (block 702). The inputs, for instance, may be received from a group policy provided by an IT professional and received via a network, input by a user using administrator privileges of the computing device 102, and so on. The inputs in this example may specify a variety of different sizes, such as fifty megabytes for the application cache 120 and five hundred megabytes for the database cache 122.

The maximum aggregates sizes of the application and database caches, respectively, of browser storage are set at the computing device as specified by the inputs (block 704). Thus, the cache manager module 116 may then manage browser storage based on these sizes as well as other settings that may be user configurable.

For example, a threshold that is configured to cause the computing device to execute a garbage collection technique automatically and without user intervention may be set to determine if at least a portion of data stored in the application cache or database cache is to be deleted automatically and without user intervention, and if so, delete at least a point of the data (block 706). The threshold, for instance, may be based on the maximum aggregate size as described above, such as at eighty percent, within a predefined amount of the maximum aggregate size (e.g., ten megabytes). The threshold may also be set to a predefined value, which may also be computed using a wide variety of other criteria.

Once the threshold is reached, the cache manager module 116 may initiate execution of one or more garbage collection techniques to remove data from the application and/or database caches 120, 122. For instance, these techniques may employ criteria to determine what data, if any, may be removed from the caches. Examples of such criteria include updates to the data over time, assuming material frequently updated in the past is going to be re-written before use, number of accesses in a time period (e.g., assuming that more frequently accessed data is more valuable), tradeoffs between a number of accesses and size of the overall cache, percentage of the bytes accessed in a given amount of time, checking whether items in the cache have been added to the tracking protection list (e.g., possibly provided by a 3rd party, and so on. Additional examples of such criteria include an amount of time that has passed without a user interacting with the data (e.g., thirty days), types of the data (e.g., images, music files, text), purpose of the data (e.g., content versus advertisements on a webpage), and so forth. Thus, the threshold may be used to operate "in the background" without interfering with a user until the maximum aggregate size is reached as described below.

Responsive to a determination that the maximum aggregate size for the application or database cache has been reached, a prompt is output in a user interface that indicates that an amount of data to be stored in the application or database cache has reached the maximum aggregate size (block 708). As shown in FIG. 5, for instance, the prompt may be output as part of a notification bar 304. Other configurations are also contemplated, such as "toast" notifications, pop-up windows, and so forth.

A user may then select a command to cause output of an option to manually delete data associated with particular domains, e.g., particular websites. For example, selection of domains may be received from a user via interaction with a user interface (block 710), such as the user interface 600 of FIG. 6. Data may be represented in a variety of ways, such as by manifest URL, by fully-qualified domain, by top-level domain, by user, by cache type (e.g., application cache 120 and/or database cache 122), by integrity level/container, and so on.

Data from the application and database caches 120, 122 may then be deleted that relates to the selected domains (block 712). Thus, data from both caches may be deleted responsive to reaching a maximum aggregate size of either one of the caches. Other implementations are also contemplated, such as to manually select particular caches and data for deletion.

Although this example described use of maximum aggregate sizes for application or database caches, these techniques may also be leveraged to support maximum individual storage 202 sizes for individual domains. For example, the threshold for automatic garbage collection may be set for individual domains as described above. Likewise, the maximum individual storage 202 amount may also be user configurable for particular domains. In this way a domain may utilize a particular amount of storage in a cache "without asking" a user. Past that amount, the user may be prompted to indicate whether the domain is to be trusted to consume additional storage space, the amount of which may also be user configurable as further described in relation to the following figure. Naturally, a variety of other examples are also contemplated without departing from the spirit and scope thereof.

Figure 8:
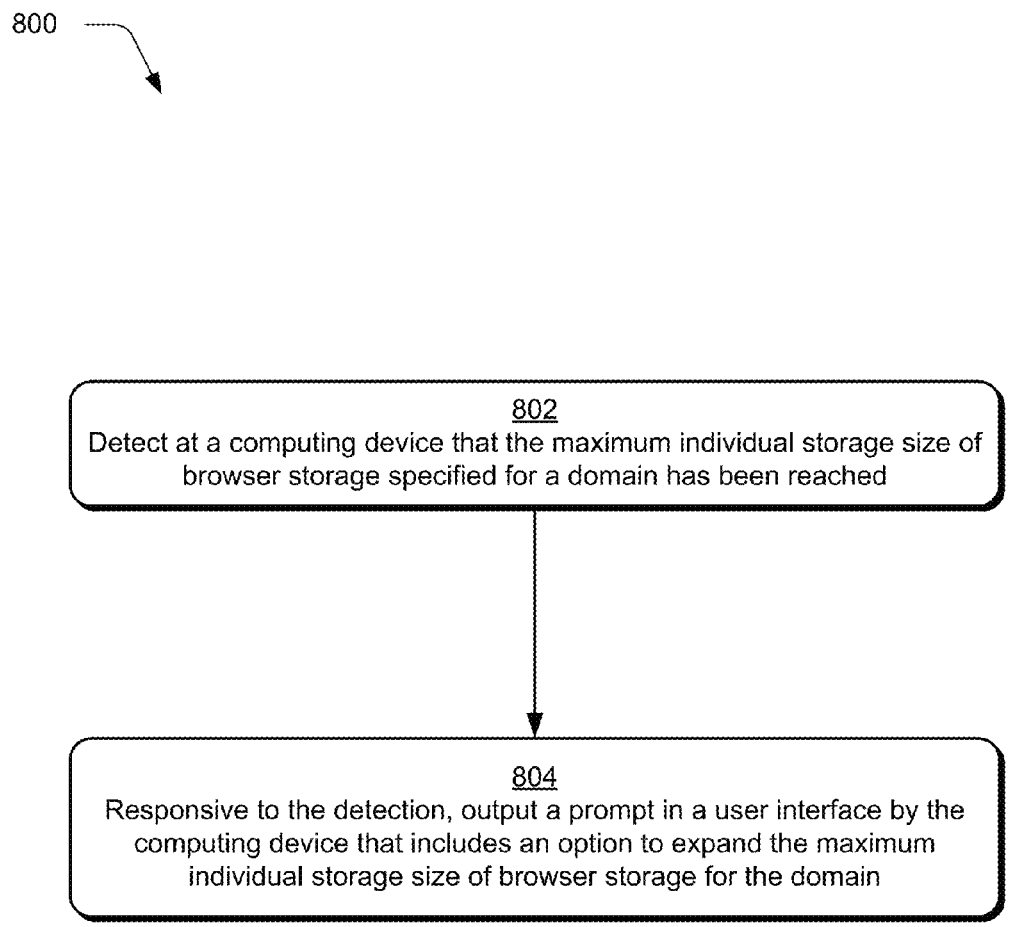
FIG. 8 depicts a procedure in an example implementation in which a prompt is output to expand an amount of space allocated to a domain in browser storage responsive to reaching a threshold.

FIG. 8 depicts a procedure 800 in an example implementation in which a prompt is output to expand an amount of space allocated to a domain in browser storage responsive to reaching a threshold. A computing device detects that the maximum individual storage size of browser storage specified for a domain has been reached (block 802). The cache manager module 116, for instance, may determine that a website has provided an amount of data to be stored in browser storage 118 that has reached the maximum individual storage 202 amount. In one or more implementations, a user is not prompted before the amount of data reaches this amount and may employ a threshold and one or more garbage collection techniques as previously described in relation to FIG. 2 although other implementations are also contemplated.

Responsive to the detection, a prompt is output in the user interface by the computing device that includes an option to expand the maximum individual storage size of browser storage for the domain (block 804). For example, the option may be selectable to automatically expand the size (e.g., double the size) responsive to a user selection. In another example, the option may be configured to accept a specific value from the user for the expansion, e.g., expand by five megabytes, defines a total size, and so on. Further, these techniques may be used to expand the application 120 or database caches 122 alone or together, e.g., specify different values for the different caches, a total overall value for both caches, and so on. A variety of other examples are also contemplated.

Example System and Device

Figure 9:
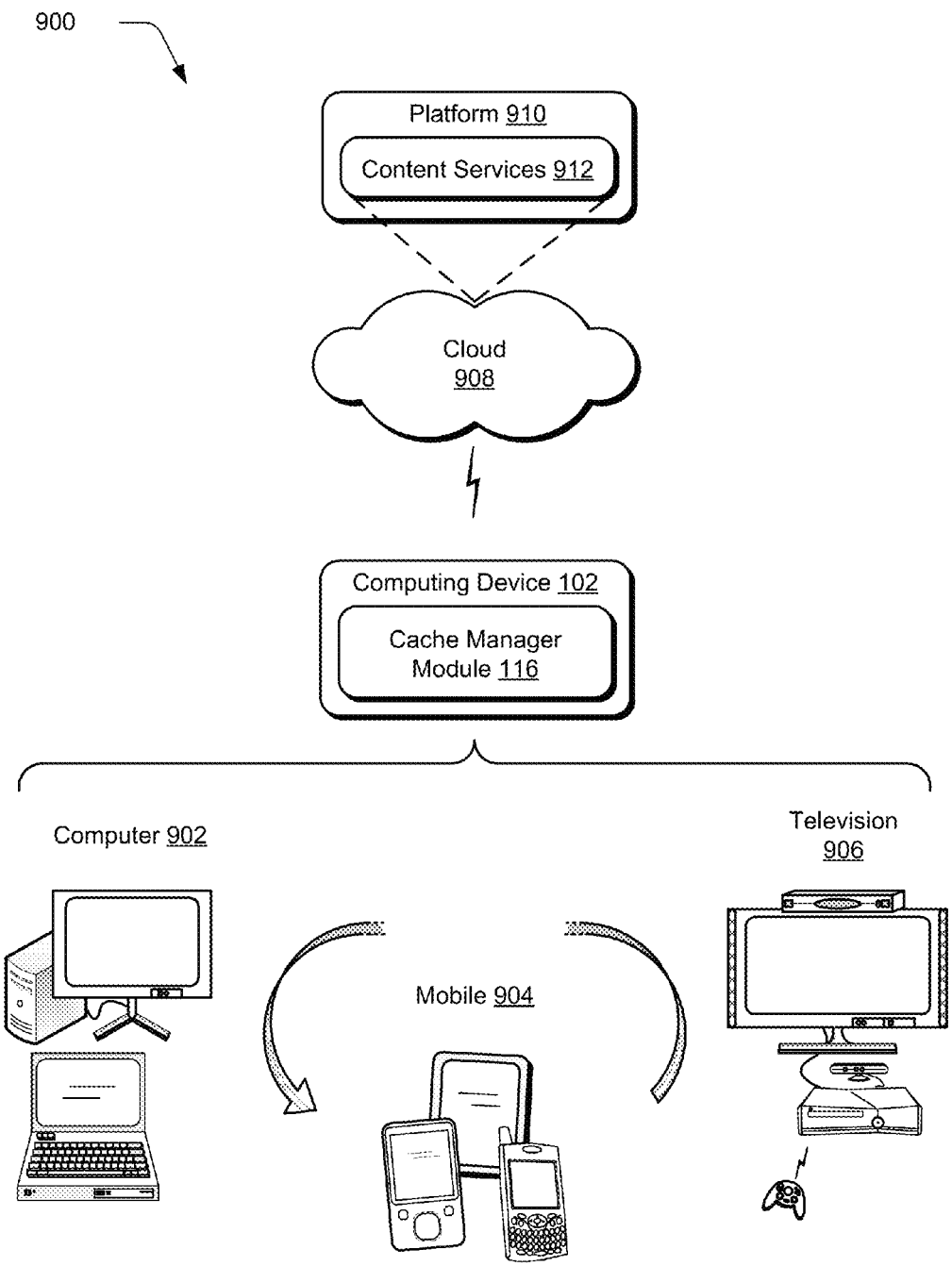
FIG. 9 illustrates an example system that includes the computing device as described with reference to FIG. 1.

FIG. 9 illustrates an example system 900 that includes the computing device 102 as described with reference to FIG. 1. The example system 900 enables ubiquitous environments for a seamless user experience when running applications on a personal computer (PC), a television device, and/or a mobile device. Services and applications run substantially similar in all three environments for a common user experience when transitioning from one device to the next while utilizing an application, playing a video game, watching a video, and so on.

In the example system 900, multiple devices are interconnected through a central computing device. The central computing device may be local to the multiple devices or may be located remotely from the multiple devices. In one embodiment, the central computing device may be a cloud of one or more server computers that are connected to the multiple devices through a network, the Internet, or other data communication link. In one embodiment, this interconnection architecture enables functionality to be delivered across multiple devices to provide a common and seamless experience to a user of the multiple devices. Each of the multiple devices may have different physical requirements and capabilities, and the central computing device uses a platform to enable the delivery of an experience to the device that is both tailored to the device and yet common to all devices. In one embodiment, a class of target devices is created and experiences are tailored to the generic class of devices. A class of devices may be defined by physical features, types of usage, or other common characteristics of the devices.

In various implementations, the computing device 102 may assume a variety of different configurations, such as for computer 902, mobile 904, and television 906 uses. Each of these configurations includes devices that may have generally different constructs and capabilities, and thus the computing device 102 may be configured according to one or more of the different device classes. For instance, the computing device 102 may be implemented as the computer 902 class of a device that includes a personal computer, desktop computer, a multi-screen computer, laptop computer, netbook, and so on. Each of this different configuration may employ the techniques described herein, as illustrated through inclusion of the cache manager module 116.

The computing device 102 may also be implemented as the mobile 904 class of device that includes mobile devices, such as a mobile phone, portable music player, portable gaming device, a tablet computer, a multi-screen computer, and so on. The computing device 102 may also be implemented as the television 906 class of device that includes devices having or connected to generally larger screens in casual viewing environments. These devices include televisions, set-top boxes, gaming consoles, and so on. The techniques described herein may be supported by these various configurations of the computing device 102 and are not limited to the specific examples the techniques described herein.

The cloud 908 includes and/or is representative of a platform 910 for content services 912. The platform 910 abstracts underlying functionality of hardware (e.g., servers) and software resources of the cloud 908. The content services 912 may include applications and/or data that can be utilized while computer processing is executed on servers that are remote from the computing device 102. Content services 912 can be provided as a service over the Internet and/or through a subscriber network, such as a cellular or Wi-Fi network.

The platform 910 may abstract resources and functions to connect the computing device 102 with other computing devices. The platform 910 may also serve to abstract scaling of resources to provide a corresponding level of scale to encountered demand for the content services 912 that are implemented via the platform 910. Accordingly, in an interconnected device embodiment, implementation of functionality of the functionality described herein may be distributed throughout the system 900. For example, the functionality may be implemented in part on the computing device 102 as well as via the platform 910 that abstracts the functionality of the cloud 908.

Figure 10:
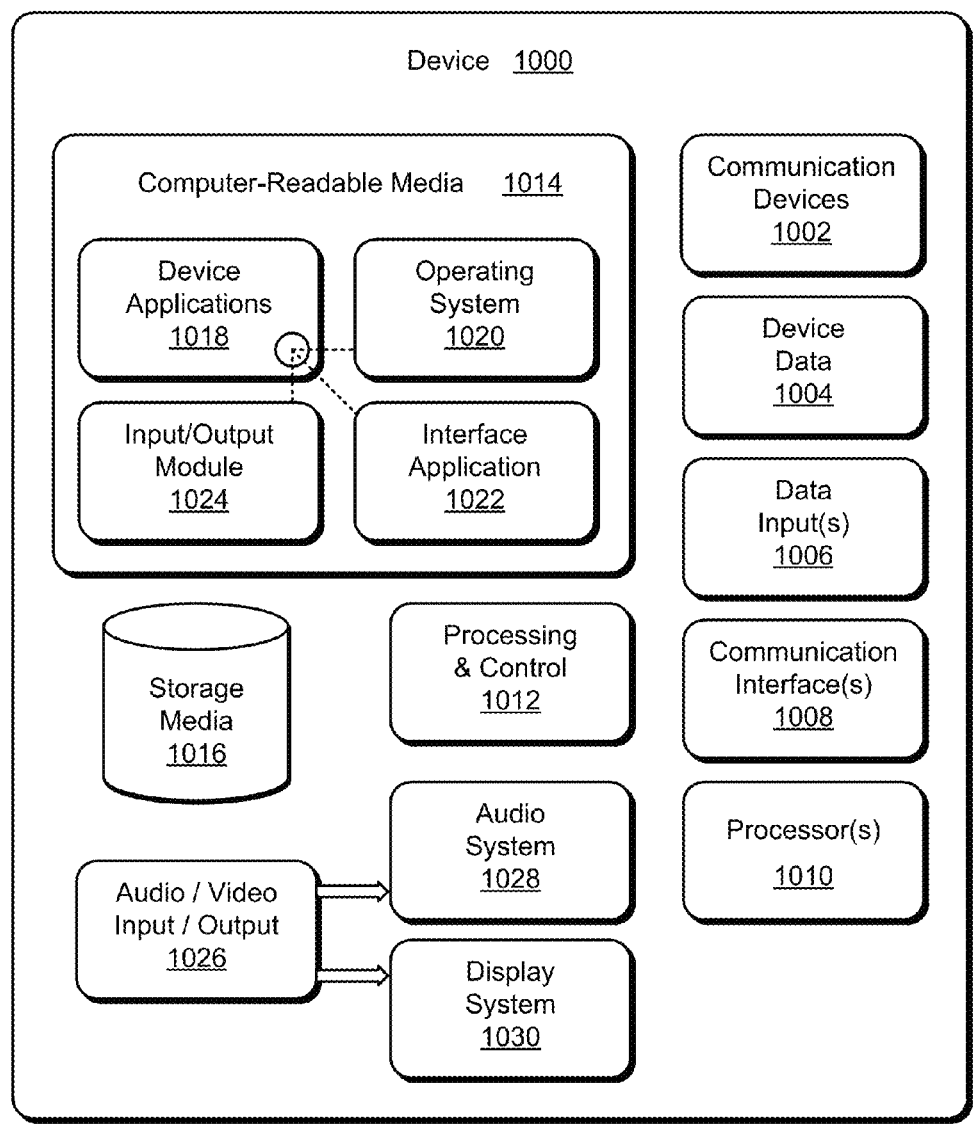
FIG. 10 illustrates various components of an example device that can be implemented as any type of computing device as described with reference to FIGS. 1, 2, and 9 to implement embodiments of the techniques described herein.

FIG. 10 illustrates various components of an example device 1000 that can be implemented as any type of computing device as described with reference to FIGS. 1, 2, and 9 to implement embodiments of the techniques described herein. Device 1000 includes communication devices 1002 that enable wired and/or wireless communication of device data 1004 (e.g., received data, data that is being received, data scheduled for broadcast, data packets of the data, etc.). The device data 1004 or other device content can include configuration settings of the device, media content stored on the device, and/or information associated with a user of the device. Media content stored on device 1000 can include any type of audio, video, and/or image data. Device 1000 includes one or more data inputs 1006 via which any type of data, media content, and/or inputs can be received, such as user-selectable inputs, messages, music, television media content, recorded video content, and any other type of audio, video, and/or image data received from any content and/or data source.

Device 1000 also includes communication interfaces 1008 that can be implemented as any one or more of a serial and/or parallel interface, a wireless interface, any type of network interface, a modem, and as any other type of communication interface. The communication interfaces 1008 provide a connection and/or communication links between device 1000 and a communication network by which other electronic, computing, and communication devices communicate data with device 1000.

Device 1000 includes one or more processors 1010 (e.g., any of microprocessors, controllers, and the like) which process various computer-executable instructions to control the operation of device 1000 and to implement embodiments of the techniques described herein. Alternatively or in addition, device 1000 can be implemented with any one or combination of hardware, firmware, or fixed logic circuitry that is implemented in connection with processing and control circuits which are generally identified at 1012. Although not shown, device 1000 can include a system bus or data transfer system that couples the various components within the device. A system bus can include any one or combination of different bus structures, such as a memory bus or memory controller, a peripheral bus, a universal serial bus, and/or a processor or local bus that utilizes any of a variety of bus architectures.

Device 1000 also includes computer-readable media 1014, such as one or more memory components, examples of which include random access memory (RAM), non-volatile memory (e.g., any one or more of a read-only memory (ROM), flash memory, EPROM, EEPROM, etc.), and a disk storage device. A disk storage device may be implemented as any type of magnetic or optical storage device, such as a hard disk drive, a recordable and/or rewriteable compact disc (CD), any type of a digital versatile disc (DVD), and the like. Device 1000 can also include a mass storage media device 1016.

Computer-readable media 1014 provides data storage mechanisms to store the device data 1004, as well as various device applications 1018 and any other types of information and/or data related to operational aspects of device 1000. For example, an operating system 1020 can be maintained as a computer application with the computer-readable media 1014 and executed on processors 1010. The device applications 1018 can include a device manager (e.g., a control application, software application, signal processing and control module, code that is native to a particular device, a hardware abstraction layer for a particular device, etc.). The device applications 1018 also include any system components or modules to implement embodiments of the techniques described herein. In this example, the device applications 1018 include an interface application 1022 and an input/output module 1024 (which may be the same or different as input/output module 114) that are shown as software modules and/or computer applications. The input/output module 1024 is representative of software that is used to provide an interface with a device configured to capture inputs, such as a touchscreen, track pad, camera, microphone, and so on. Alternatively or in addition, the interface application 1022 and the input/output module 1024 can be implemented as hardware, software, firmware, or any combination thereof. Additionally, the input/output module 1024 may be configured to support multiple input devices, such as separate devices to capture visual and audio inputs, respectively.

Device 1000 also includes an audio and/or video input-output system 1026 that provides audio data to an audio system 1028 and/or provides video data to a display system 1030. The audio system 1028 and/or the display system 1030 can include any devices that process, display, and/or otherwise render audio, video, and image data. Video signals and audio signals can be communicated from device 1000 to an audio device and/or to a display device via an RF (radio frequency) link, S-video link, composite video link, component video link, DVI (digital video interface), analog audio connection, or other similar communication link. In an embodiment, the audio system 1028 and/or the display system 1030 are implemented as external components to device 1000. Alternatively, the audio system 1028 and/or the display system 1030 are implemented as integrated components of example device 1000.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. A computer system for managing browser storage, comprising:
    one or more processor; and
    one or more storage device having stored thereon computer-executable instructions that are executable by the one or more processor to configure the computer system to manage browser storage, including computer-executable instructions that are executable by the one or more processor to configure the computer system to perform at least the following:
    receive inputs from a non-local source, the inputs specifying:
    a maximum storage size of an individual application cache specified for each of one or more domains, wherein the individual application cache is configured to store data locally that was obtained via a network from each of one or more websites associated with the one or more domains and which are involved in generating and displaying the one or more websites;
    a maximum storage size of an individual database cache for each of one or more individual database caches specified for each of the one or more domains, wherein the individual database cache is configured to store data for synchronizing with each of the one or more domains via the network;
    a maximum storage size of an aggregate application cache, wherein the maximum storage size of the aggregate application cache comprises a total amount of application storage that is permitted to be collectively used for the maximum storage size of all the individual application caches specified for the one or more domains; and
    a maximum storage size of an aggregate database cache, wherein the maximum storage size of the aggregate database cache comprises a total amount of database storage that is permitted to be collectively used for the maximum storage size of all the individual database caches specified for the one or more domains;
    set the maximum storage sizes of individual and aggregate application and database caches, respectively, to the sizes specified by the inputs;
    define a first threshold, wherein the first threshold is below the maximum storage size of the individual application cache specified for each of one or more domains;
    define a second threshold, wherein the second threshold is below the maximum storage size of the individual database cache specified for each of one or more domains;
    define a third threshold, wherein the third threshold is below the maximum storage size of the aggregate application cache;
    define a fourth threshold, wherein the fourth threshold is below the maximum storage size of the aggregate database cache;
    in response to any of the thresholds being reached, execute a garbage collection technique automatically and without user intervention to determine if at least a portion of data stored is to be deleted based on one or more predefined criteria; and
    delete at least the portion of the data.

2. The computer system of claim 1, wherein each of the individual application caches and the individual database caches are usable to store data locally at the computing device, corresponding to a particular domain and website, such that the data is available offline when access to the corresponding website is unavailable.

3. The computer system of claim 1, wherein the inputs are received from an administrator of the computing device or a group policy.

4. The computer system of claim 1, wherein each threshold is computed based on the maximum aggregate size for the respective one of the application or database caches.

5. The computer system of 1, wherein each threshold is a predefined percentage of the maximum aggregate size for the respective one of the application or database caches.

6. The computer system of claim 1, further comprising responsive to a determination that the maximum storage size of the aggregate application or database cache has been reached, outputting a prompt in a user interface that indicates that an amount of data to be stored in the application or database cache has reached the maximum aggregate size.

7. The computer system of claim 6, wherein the prompt includes an option that is selectable to enable a user to manually specify one or more items of the data to be deleted form the corresponding individual application or database cache.

8. The computer system of claim 6, wherein the user interface is further configured to enable a user to manually select a domain to cause data that is associated with the domain to be removed from both of the corresponding individual application cache and individual database cache.

9. The computer system of claim 6, wherein the prompt is displayed in a notification bar within the user interface.

10. The computer system of claim 9, wherein the notification bar is presented at a location within the browsing field-of-view that is selected to reduce user distraction.

11. The computer system of claim 6, wherein the prompt includes an option to expand the maximum storage size of the individual application or database cache for a corresponding domain based on a user selection or a user specified specific value.

12. The computer system of claim 1, wherein the individual database cache comprises a configuration setting and is configured to disseminate the configuration setting to other computer systems of a user.

13. The computer system of claim 1, wherein upon the first or second threshold being reached, the garbage collection technique determining that data within a corresponding individual application or database cache that has not been accessed by a user within a predefined amount of time is to be deleted.

14. The computer system of claim 1, wherein upon the third or fourth threshold being reached, the garbage collection technique determining that data within any corresponding individual application or database caches specified for each of the one or more domains that has not been accessed by a user with a predefined amount of time is to be deleted.

15. The computer system of claim 1, wherein the one or more predefined criteria comprises a predetermined amount of time since the last access, content type, or purpose.

16. A method, implemented at a computer system that includes one or more processors, for managing browser storage, the method comprising:
 receiving inputs at from a non-local source, the inputs specifying:
  a maximum storage size of an individual application cache specified for each of one or more domains, wherein the individual application cache is configured to store data locally that was obtained via a network from each of one or more websites associated with the one or more domains and which are involved in generating and displaying the one or more websites;
  a maximum storage size of an individual database cache for each of one or more individual database caches specified for each of the one or more domains, wherein the individual database cache is configured to store data for synchronizing with each of the one or more domains via the network;
  a maximum storage size of an aggregate application cache, wherein the maximum storage size of the aggregate application cache comprises a total amount of application storage that is permitted to be collectively used for the maximum storage size of all the individual application caches specified for the one or more domains; and
  a maximum storage size of an aggregate database cache, wherein the maximum storage size of the aggregate database cache comprises a total amount of database storage that is permitted to be collectively used for the maximum storage size of all the individual database caches specified for the one or more domains;
 setting the maximum storage sizes of individual and aggregate application and database caches, respectively, to the sizes specified by the inputs;
 defining a first threshold, wherein the first threshold is below the maximum storage size of the individual application cache specified for each of one or more domains;
 defining a second threshold, wherein the second threshold is below the maximum storage size of the individual database cache specified for each of one or more domains;
 defining a third threshold, wherein the third threshold is below the maximum storage size of the aggregate application cache;
 defining a fourth threshold, wherein the fourth threshold is below the maximum storage size of the aggregate database cache;
 in response to any of the thresholds being reached, executing a garbage collection technique automatically and without user intervention to determine if at least a portion of data stored is to be deleted based on one or more predefined criteria; and
 delete at least the portion of the data.

17. A method as described in claim 16, further comprising responsive to a determination that the maximum storage size of the aggregate application or database cache has been reached, outputting a prompt in a user interface that indicates that an amount of data to be stored in the aggregate application or database cache has reached the maximum storage size.

18. A method as described in claim 17, wherein the user interface is further configured to enable a user to manually select a website to cause data that is associated with the website to be removed from both of the corresponding individual application cache and individual database cache.

19. A computer program product comprising one or more hardware storage devices having stored thereon computer-executable instructions that are executable by one or more processors of a computer system and that configure the computer system to manage browser storage, including computer-executable instructions that configure the computer system to perform at least the following:
 receive inputs at from a non-local source, the inputs specifying:
  a maximum storage size of an individual application cache specified for each of one or more domains, wherein the individual application cache is configured to store data locally that was obtained via a network from each of one or more websites associated with the one or more domains and which are involved in generating and displaying the one or more websites;
  a maximum storage size of an individual database cache for each of one or more individual database caches specified for each of the one or more domains, wherein the individual database cache is configured to store data for synchronizing with each of the one or more domains via the network;
  a maximum storage size of an aggregate application cache, wherein the maximum storage size of the aggregate application cache comprises a total amount of application storage that is permitted to be collectively used for the maximum storage size of all the individual application caches specified for the one or more domains; and
  a maximum storage size of an aggregate database cache, wherein the maximum storage size of the aggregate database cache comprises a total amount of database storage that is permitted to be collectively used for the maximum storage size of all the individual database caches specified for the one or more domains;
 set the maximum storage sizes of individual and aggregate application and database caches, respectively, to the sizes specified by the inputs;

define a first threshold, wherein the first threshold is below the maximum storage size of the individual application cache specified for each of one or more domains;

define a second threshold, wherein the second threshold is below the maximum storage size of the individual database cache specified for each of one or more domains;

define a third threshold, wherein the third threshold is below the maximum storage size of the aggregate application cache;

define a fourth threshold, wherein the fourth threshold is below the maximum storage size of the aggregate database cache;

in response to any of the thresholds being reached, execute a garbage collection technique automatically and without user intervention to determine if at least a portion of data stored is to be deleted based on one or more predefined criteria; and delete at least the portion of the data.

\* \* \* \* \*